Jan. 1, 1963

H. H. STILLEY 3,071,254

TRACTOR WITH BOOM ATTACHMENT

Filed Dec. 30, 1959

3 Sheets-Sheet 2

INVENTOR.
HERSCHEL H. STILLEY
BY Kenneth C. Witt
ATTORNEY

Jan. 1, 1963 H. H. STILLEY 3,071,254
TRACTOR WITH BOOM ATTACHMENT
Filed Dec. 30, 1959 3 Sheets-Sheet 3

Fig. 3

*INVENTOR.*
HERSCHEL H. STILLEY
BY
Kenneth C. Witt
ATTORNEY

United States Patent Office 3,071,254
Patented Jan. 1, 1963

3,071,254
TRACTOR WITH BOOM ATTACHMENT
Herschel H. Stilley, St. Joseph, Mich., assignor to Clark Equipment Company, a corporation of Michigan
Filed Dec. 30, 1959, Ser. No. 862,912
10 Claims. (Cl. 212—8)

This invention relates to tractors equipped with a boom attachment to form a portable derrick or hoisting machine.

The object of the invention is to provide a more versatile machine of this type in which the boom may be readily positioned in a plurality of locations on the tractor.

A further object is to provide an extendible counterweight for increasing the lifting capacity of the machine, which counterweight also can be moved readily from one position on the machine to another.

A still further object is to provide a machine as described which may have the boom and counterweight retracted to provide minimum dimensions for travel on the highway or for negotiating in cramped quarters.

In carrying out my invention in one form, I provide a tractor having two brackets extending respectively from the sides thereof. Each of these brackets is provided with identical mounting means. A pivotable boom and the operating means for such boom are removably connected to the mounting means on one bracket, while an extendible counterweight with the operating means for the counterweight are removably mounted on the other mounting means.

Figure 1:
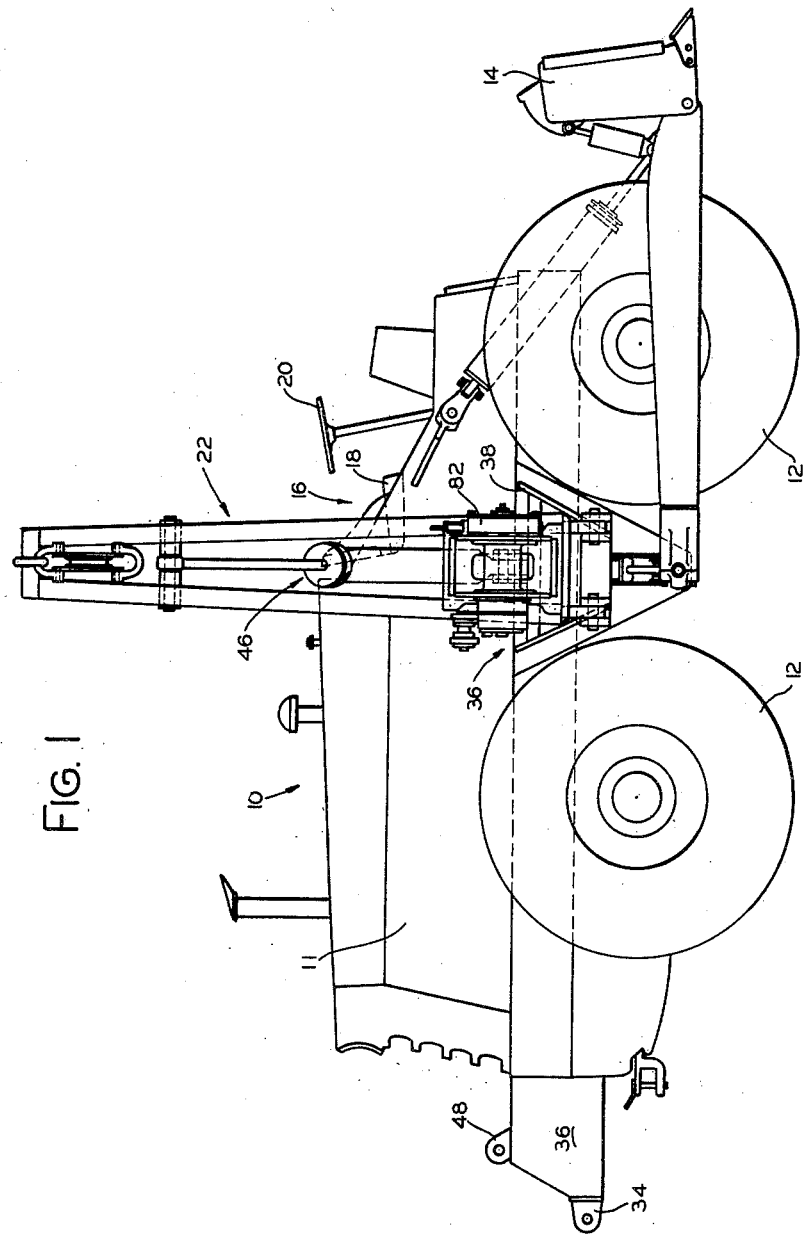
Figure 2:
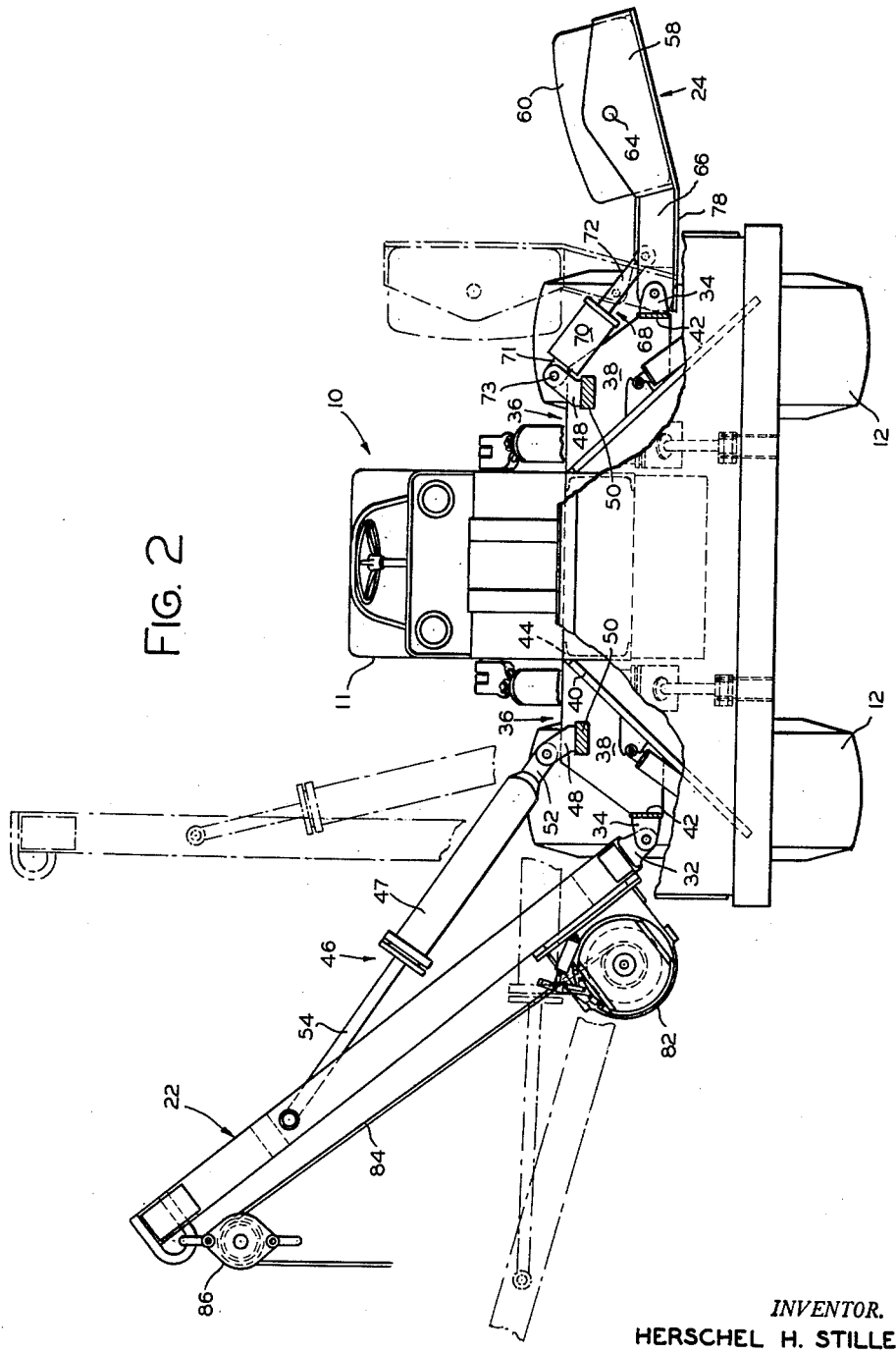

For a clearer and more complete understanding of my invention reference should be had to the accompanying drawing in which FIGURE 1 is a side elevation of a tractor embodying a preferred form of my invention, FIGURE 2 is a front elevation of the same vehicle, and FIGURE 3 is a top plan view of the same vehicle.

There is shown in all three figures of the drawing a tractor vehicle indicated generally by the reference numeral 10 having a body portion 11. The vehicle illustrated has four rubber-tired wheels 12 although it will be readily appreciated that the present invention may be utilized in a crawler type tractor also, if desired. The tractor illustrated also is provided with a bulldozer blade 14 at the front together with the mounting structure for same and the mechanism necessary for raising, lowering and tilting the bulldozer blade. However, this does not form a part of the present invention.

In addition, the vehicle 10 is provided with an operator's station indicated generally by the numeral 16 which includes a seat 18 and an operator's steering wheel 20. Included at the operator's station but not shown on the drawing are the pedals and levers necessary for operating the vehicle and the bulldozer blade.

The machine 10 has a pivotable boom structure 22 mounted on the right side (facing in the direction of the operator) and a pivotable counterweight structure 24 pivotally mounted on the left side.

The boom structure 22 includes a pair of side frame members 26 and a cross member 28 at the outer end. Also, a cross member 30 at the inner end and a pair of bosses 32 extending inwardly by means of which the boom structure is pivotally mounted on a pair of clevis portions 34. The bosses 32 are pivotally secured to the clevis portions 34 by removable pins 33. The clevis portions 34 are rigidly secured on a bracket structure indicated generally by the numeral 36 which includes a pair of slanted side frame members 38, a slanted bottom member 40 and an outer cross frame member 42 interconnecting the two side members 38. All of the frame members 38, 40 and 42 of the bracket structure are suitably secured together preferably by welding to form a rigid structure, and the bracket structure 36 likewise is rigidly secured to the frame 44 of the vehicle. As illustrated the bottom member 40 of the bracket structure is also utilized as a part of the supporting and operating mechanism for the push beam of the bulldozer blade but such dual function is not essential to the invention.

The boom structure 22 is raised and lowered by means of a piston and cylinder type hydraulic actuator 46 which is pivotally connected at its inner end to a clevis structure 48 rigidly mounted on a cross member 50 which also is rigidly secured to and forms a part of the bracket structure 36. A boss 52 on the inner end of the cylinder 47 of actuator 46 is secured to the clevis member 48 by means of a removable pin 51 as illustrated. The outer end of the piston rod 54 of the actuator is pivotally connected to a cross member 56 extending between the side frame members 26, 26 of the boom structure.

The boom 22 is pivotable vertically between an approximately vertical position to a position approaching horizontal as illustrated by the dot-dash lines in FIG. 2. Such pivoting is accomplished by admitting hydraulic fluid under pressure to one end or the other of the cylinder 47 of the actuator 46 to extend or retract the piston and piston rod 54 which is connected to the piston.

The counterweight structure includes an outer box portion 58 which is arranged to receive a plurality of individual metal weights 60. The weights 60 are held in the box portion by means of a removable pin 64. Thus the individual weights may be readily removed or the number of individual weights varied to suit a particular application.

The box structure 58 is pivotally mounted by means of a pair of structural or boss members 66 to a bracket structure which is identical with the bracket structure 36 on the other side of the vehicle. Each of the parts of the left-hand bracket has been given the same identifying numeral as the corresponding part of the right-hand bracket to illustrate this identity of structure. The counterweight structure is pivoted by means of an hydraulic piston and cylinder type actuator 68 which includes a cylinder 70 and a piston rod 72. The cylinder is pivotally connected to clevis portion 48 by means of boss 71 on the cylinder and a removable pin 51, while the outer end of the piston rod 72 is pivotally connected by means of a removable pin 74 to a pair of bracket members 76 which are secured to the box structure 58. A gusset plate 78 preferably is welded to the outer or lower edges of members 66 and 76 as well as to box structure 58 to form a rigid pivotable counterweight structure.

As actuator 68 is extended and retracted by admitting hydraulic fluid to the inner or outer end respectively of the cylinder 70 the counterweight structure is moved between the extended position illustrated in solid lines in FIG. 2 and the retracted position illustrated by the dash-dot lines.

The actuators 46 and 68 may be controlled by levers adjacent the operator's seat 18, and the tops of suitable levers are illustrated generally at 80 in FIG. 3. It will be appreciated that the tractor vehicle 10 is provided with a pump, preferably driven by the engine of the tractor, for providing hydraulic fluid under pressure for operating the hydraulic actuators 46 and 68 as well as other hydraulic devices on the tractor. The various hydraulic lines have been omitted from the drawing in order to simplify it and make it more readily understood. The connections between the various components of the hydraulic circuit can be made in the usual manner, utilizing flexible hoses where necessary. As illustrated the tractor 10 also includes a winch 82 driven by an hydraulic motor for operating a cable 84 over a sheave 86 to provide for hoisting and other operations.

In view of the fact that the two brackets 36 extending laterally out from the respective sides of the machine are identical it will be readily appreciated that the boom structure 22 and the counterweight structure 24 may be readily interchanged by disconnecting the hydraulic lines, and then removing the pins 33 and 51. After the two attachments have been interchanged the pins 33 and 51 on each side are replaced and the hydraulic connections restored. It will be appreciated that it is a simple matter to make the length of the hydraulic hoses for the boom actuator 46 such that they can be readily passed beneath the seat of the vehicle and connected to the actuator 46 on the left side of the machine, while the connections for the actuator 68 of the removable counterweight similarly can be readily connected to this attachment on the right side of the machine.

This structure makes it possible for the operator readily to extend the counterweight structure 24 whenever counterbalancing is needed for the operation being performed with the boom structure 22 on the opposite side of the machine. All operations of the boom and the counterweight are performed merely by operating levers 80 adjacent the operator's seat. For travel the boom structure and the counterweight structure are moved by remote control to the vertically disposed positions illustrated in dash-dot lines in FIG. 2 in which positions they are within the outer margins of the tractor and thus do not increase the vehicle's width during movement from one job to another or through areas of narrow clearance.

I have also illustrated a bracket 36 projecting from the rear of the machine which is identical with the other two brackets 36 insofar as the dual mounting means comprised of clevis portions 34 and 48 are concerned. If hydraulic connections of the proper length are used it is possible also to connect the boom structure 22 on this bracket structure. It is not possible to utilize the counterweight 24 as a counterbalance when the boom is in this location but such is not important because the weight of the bulldozer blade at the front of the machine ordinarily provides sufficient counterbalancing action.

It will be readily appreciated by those skilled in the art that this invention fulfills the objects set forth hereinbefore and provides a versatile and adaptable machine on which the boom may be readily positioned in a plurality of locations, having an extendible counterweight which likewise may be readily moved from one position to another on the machine, and in which both the boom and counterweight may be retracted to within the outline or envelope of the machine. Many machines of this type now in use have large frame structures surrounding the body of the machine or extending over the top of the machine or both, and those familiar with such prior art machines will readily understand the simplicity and versatility provided by the present invention. In the present structure both the attachment (either boom or counterweight) and the operating means for the attachment are connected on the same side of the machine which greatly facilitates removal and installation.

While I have described and illustrated herein a preferred embodiment of my invention it will be appreciated that modifications may be made by those skilled in the art. Accordingly it should be understood that I intend to cover by the appended claims all such modifications which fall within the true spirit and scope of my invention.

I claim:

1. In a tractor vehicle having a body portion, a mounting bracket projecting laterally from one side of the body portion having dual mounting means thereon, another mounting bracket projecting laterally from the other side of the body portion having additional dual mounting means thereon, a pivotable boom and operating means for the said pivotable boom removably mounted on the dual mounting means on one mounting bracket, a pivotable counterweight and operating means for the said pivotable counterweight removably mounted on the dual mounting means on the other mounting bracket, and the said brackets and the respective dual mounting means thereon and the said pivotable boom and its operating means and the said pivotable counterweight and its operating means being so constructed and arranged that either the pivotable boom or the pivotable counterweight can be mounted selectively on either of the mounting brackets.

2. A vehicle having two mounting brackets extending respectively from the sides thereof, two identical dual mounting means located respectively on the said brackets, a pivotable boom and operating means for the said pivotable boom removably mounted on the said dual mounting means on one mounting bracket, and a pivotable counterweight and operating means for the said pivotable counterweight removably mounted on the said dual mounting means on the other mounting bracket.

3. A tractor having two mounting brackets extending respectively from the sides thereof, two identical dual mounting means located respectively on the said brackets, each such dual mounting means comprising first and second connection means adapted for pivotally connecting an attachment to the tractor and third connection means adapted for pivotally connecting to the tractor operating means for said attachment.

4. A tractor having two mounting brackets extending respectively from the sides thereof and a third mounting bracket extending from one end thereof, three identical dual mounting means located respectively on the said brackets, each such mounting means comprising first connection means adapted for pivotally connecting an attachment to the tractor and second connection means adapted for pivotally connecting to the tractor operating means for said attachment.

5. A tractor having two mounting brackets extending respectively from the sides thereof, two identical dual mounting means located respectively on the said brackets, each such dual mounting means comprising first clevis connection means at a predetermined height adapted for pivotally connecting a removable attachment to the tractor and second clevis connection means at a higher elevation adapted for pivotally connecting to the tractor operation means for the attachment.

6. In a tractor vehicle having a body portion, a mounting bracket projecting laterally from one side of the body portion having dual mounting means thereon, another mounting bracket projecting laterally from the other side of the body portion having additional dual mounting means thereon, each of the said dual mounting means comprising lower connection means for removably connecting a pivotable attachment at a predetermined height and upper connection means for removably connecting at a greater height a piston and cylinder actuator for the pivotable attachment, a pivotable boom structure having one end connected to one of the said lower connection means and arranged to pivot vertically, a first piston and cylinder hydraulic actuator for the said boom structure connected between the boom structure and the corresponding upper connection means, a pivotable counterweight structure connected to the other lower connection means, and a second piston and cylinder actuator connected between the said counterweight structure and the corresponding upper connection means for pivoting the said counterweight structure between an approximately horizontally disposed position and a vertically disposed position.

7. In a tractor vehicle having a body portion, defining the outline or envelope of the vehicle, two identical mounting means disposed one on each side of said vehicle and each having connection means providing pivotal support for an attachment and located inboard of the body portion by an amount sufficient to effect retraction of its attachment within the outline of said vehicle, and second connection means forming a connection between said vehicle and operating means for said attachment, each said first and second connections having releasable members connecting said mounting means and its associated attachment, one of said attachments being comprised of a pivotable boom and the other of said attachments being comprised of a pivotable counterweight, said attachments each having mounting-and-actuator means complementary with the first and second connection means of said mounting means so that the pivotable boom and pivotable counterweight are interchangeable to be on either vehicle side and are both supportable and pivotable through their complementary mounting-and-actuator means on the same first and second connection means.

8. A tractor having two mounting brackets one mounted on each side thereof and each comprised of first connection means providing a pivotal mounting and a second connection means providing an actuating connection, a boom pivotally mountable on the complementary first mounting means of either of said mounting brackets for location on either side of said tractor, force-transmitting means interconnecting said boom and the second actuating connection of its associated mounting bracket, and a counterweight pivotally mountable on the pivot mounting of the other of said mounting brackets located oppositely said boom, said boom and counterweight being interchangeable from one vehicle side to the other and pivotable each on the first mounting means of both said mounting brackets.

9. The structure in accordance with claim 8 including readily removable securement means between the pivotable mountings of said boom and counterweight and the first mounting means of a respective one of said mounting brackets to effect prompt mounting and removal of said boom or counterweight.

10. A tractor having two mounting brackets located respectively one at each side of said tractor, two identical dual mounting means located respectively on the said brackets adapted for pivotally connecting in turn a selected one of a plurality of attachments to the tractor, each such dual mounting means comprising first connection means adapted for pivotally connecting in turn the selected one of a plurality of attachments to the tractor and second connection means adapted for pivotally connecting to the tractor operating means for the selected attachment, said first connection means being disposed inboard of the side of said tractor by an amount which provides that the preselected attachment in its vertical transport position is contained substantially within the outline of the tractor.

References Cited in the file of this patent

UNITED STATES PATENTS

| 2,003,599 | Tourneau | June 4, 1935 |
| 2,425,663 | Wooldridge | Aug. 12, 1947 |
| 2,722,320 | Dobeus | Nov. 1, 1955 |
| 2,991,891 | Wills | July 11, 1961 |

FOREIGN PATENTS

| 1,168,351 | France | Sept. 1, 1958 |